United States Patent [19]
Wei

[11] Patent Number: 5,881,754
[45] Date of Patent: Mar. 16, 1999

[54] VALVE DEVICE FOR FAUCET AND SPRAY GUN

[76] Inventor: Ming Te Wei, 5F., No. 63, Chong Fa Street, Keelong, Taiwan

[21] Appl. No.: 912,736

[22] Filed: Aug. 18, 1997

[51] Int. Cl.⁶ .................................................. F16K 11/044
[52] U.S. Cl. .................................. 137/119.04; 137/119.09
[58] Field of Search .......................... 137/119.03, 119.04, 137/119.06, 119.08, 119.09

[56] References Cited

U.S. PATENT DOCUMENTS

| | | | |
|---|---|---|---|
| Re. 32,981 | 7/1989 | Marty | 137/119.04 |
| 3,056,418 | 10/1962 | Adams | 137/119.04 |
| 3,841,346 | 10/1974 | Amblank | 137/119.03 X |
| 4,609,006 | 9/1986 | Parkison et al. | 137/119.04 |
| 5,743,286 | 4/1998 | Ko | 137/119.04 |
| 5,778,921 | 7/1998 | Ko | 137/119.04 |

*Primary Examiner*—Stephen M. Hepperle

[57] ABSTRACT

A valve device includes a base, and a faucet and a spray gun coupled to the base. A valve member is engaged in the base and has a chamber, and includes two valve seats disposed between the chamber and the faucet and between the chamber and the opening. A valve stem is slidably engaged in the valve member and has two plugs for engaging with the valve seats. A spring may bias one plug to engage with one valve seat and for preventing the water from flowing into the spray gun. The water is allowed to flow into the spray gun when the spray gun is actuated.

4 Claims, 4 Drawing Sheets

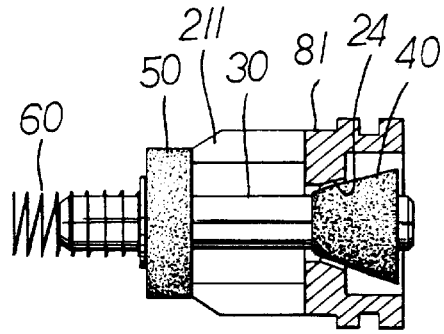
FIG. 6
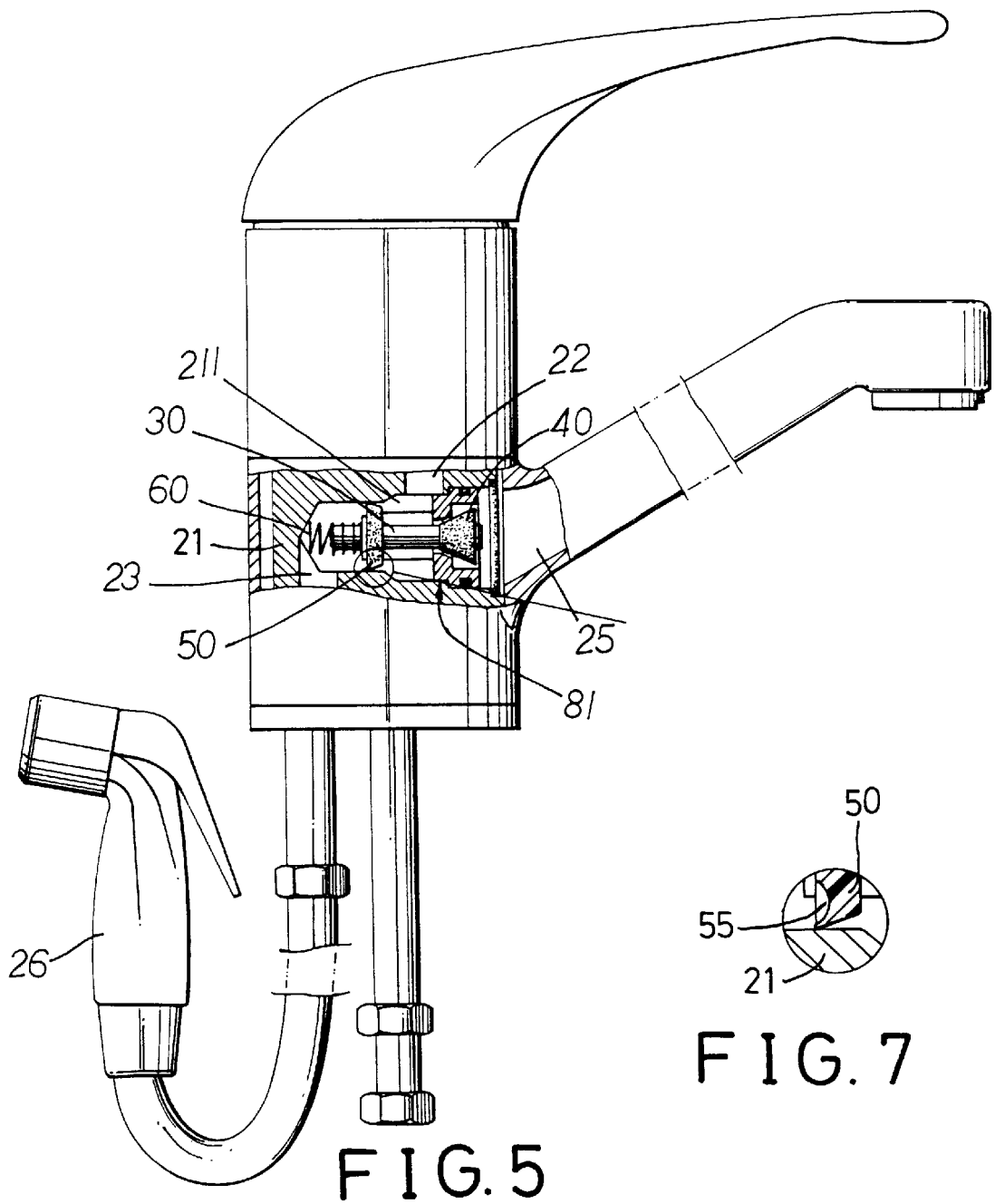
FIG. 5
FIG. 7

VALVE DEVICE FOR FAUCET AND SPRAY GUN

BACKGROUND OF THE INVENTION

1. Field of the Invention

The present invention relates to a valve, and more particularly to a valve device for faucet and spray gun.

2. Description of the Prior Art

Typical faucets include a valve device for controlling the outward flow of cold water and hot water. The typical faucets do not provide any mechanism for controlling the water flow to the spray gun when the spray gun is secured to the faucet.

The present invention has arisen to mitigate and/or obviate the afore-described disadvantages of the conventional faucets.

SUMMARY OF THE INVENTION

The primary objective of the present invention is to provide a faucet which includes a valve device for controlling the water flowing through either of the faucet or the spray gun when the spray gun is coupled to the faucet.

In accordance with one aspect of the invention, there is provided a valve device comprising a base including at least one passage for receiving water and including an opening, a spray gun secured to the base and communicating with the opening, a faucet secured to the base, a valve body engaged in the base and including a chamber for communicating with the opening and the faucet, the valve body including at least one hole for communicating the chamber with the at least one passage and including a first valve seat provided between the chamber and the faucet and including a second valve seat provided between the chamber and the opening, a valve stem slidably engaged in the valve body, a first plug and a second plug secured to the valve stem and moved in concert with the valve stem for engaging with the first valve seat and the second valve seat respectively, and means for biasing the second plug to engage with the second valve seat and for preventing the water from flowing into the opening and for allowing the water to flow into the faucet when the spray gun is not actuated. The second plug is forced to be disengaged from the second valve seat against the biasing means, and the first plug is caused to engage with the first valve seat when the spray gun is actuated, for allowing the water to flow out through the spray gun and for preventing the water from flowing through the faucet.

The biasing means includes a spring engaged on the valve stem and engaged between the base and the second plug for biasing the second plug to engage with the second valve seat.

A disc is engaged between the base and the valve body and includes an orifice for slidably engaging with the valve stem and includes at least one aperture for communicating the chamber with the opening and for allowing water to flow into the spray gun via the at least one aperture and the opening.

The valve stem includes two annular grooves for engaging with and for securing the first plug and the second plug, the valve stem includes a cone-shaped head for facilitating an engagement of the first plug to the valve stem.

Further objectives and advantages of the present invention will become apparent from a careful reading of a detailed description provided hereinbelow, with appropriate reference to accompanying drawings.

BRIEF DESCRIPTION OF THE DRAWINGS

FIG. 5 is a partial cross sectional view similar to FIGS. 1 and 4, illustrating another application of the valve device;

FIG. 6 is a plane view illustrating the valve device as shown in FIG. 5; and

FIG. 7 is a partial view of the plug.

DETAILED DESCRIPTION OF THE PREFERRED EMBODIMENT

Figure 1:
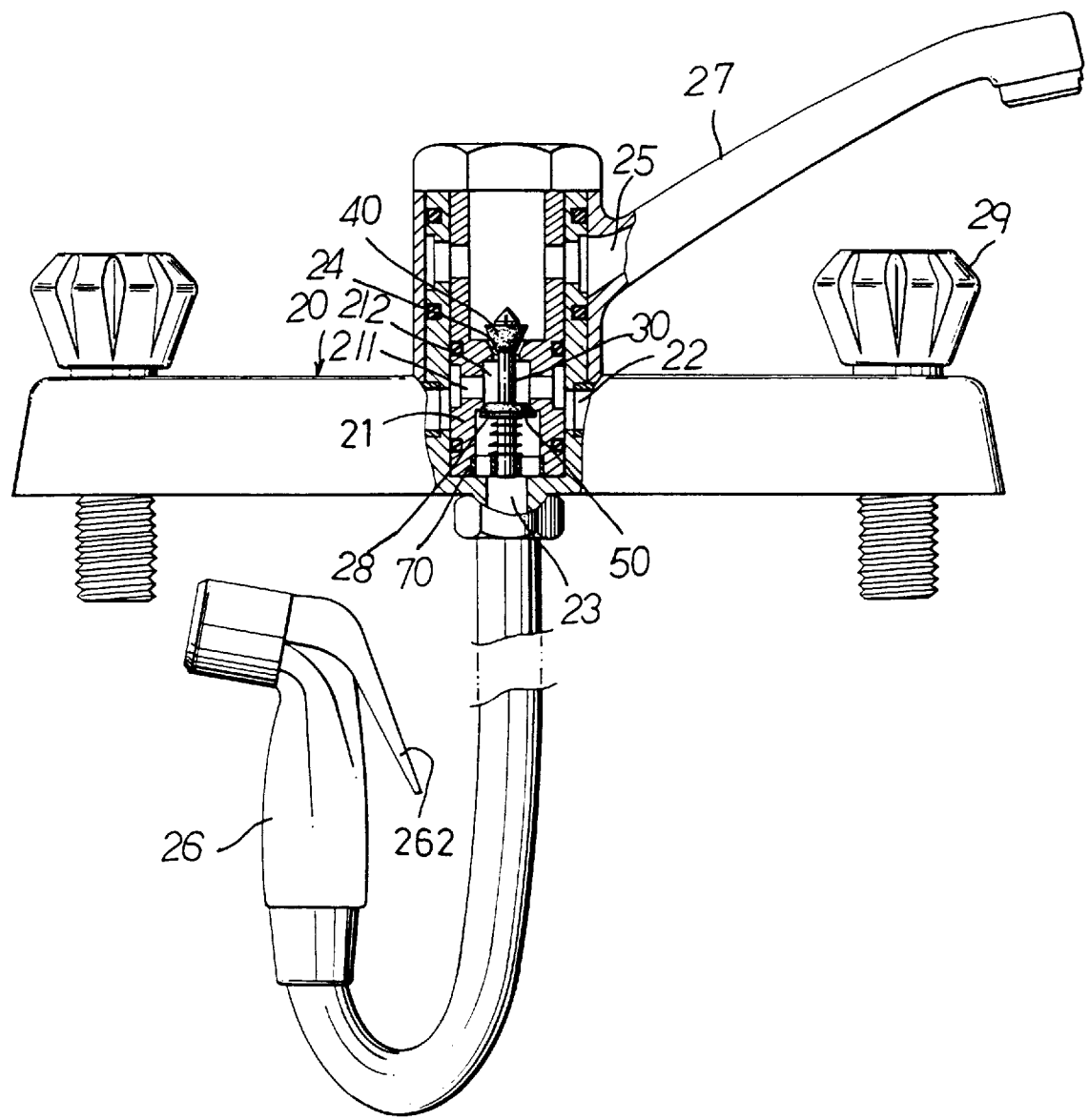
FIG. 1 is a partial cross sectional view of a faucet which employs a valve device in accordance with the present invention.
Figures 2, 3:
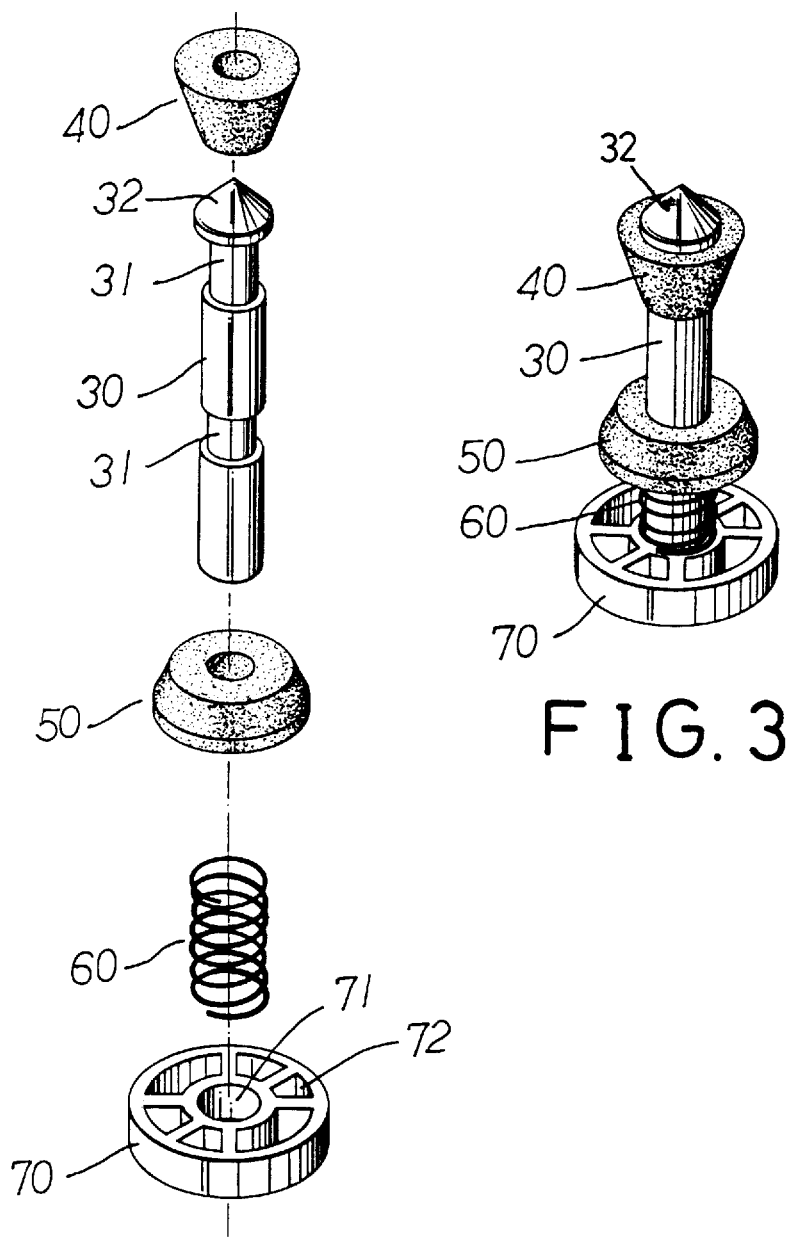
FIG. 2 is an exploded view of the valve device.
FIG. 3 is a perspective view of the valve device.

Referring to the drawings, and initially to FIGS. 1–3, a valve device in accordance with the present invention comprises a base 20 including two passages 21, 22 for receiving cold water and hot water, for example, and including an opening 23 for coupling to a spray gun 26. A valve body 21 is engaged in the base 20 and includes a chamber 212 and two holes 211 for communicating the chamber 212 with the passages 21, 22 respectively. A faucet 27 is secured to the base 20 and includes a bore 25 for communicating with the chamber 212. The valve body 21 includes a valve seat 24 provided between the chamber 212 and the bore 25 of the faucet 27, and includes another valve seat 28 provided between the chamber 212 and the opening 23. The seat 20 includes two knobs 29 for controlling the water flowing into the passages 21, 22 respectively.

A valve stem 30 includes two annular grooves 31 for engaging with and for securing two plugs 40, 50 which are provided for engaging with the valve seats 24, 28 respectively. The valve stem 30 preferably includes a cone-shaped head 32 for allowing the plug 40 to be easily engaged in the valve stem 30. A disc 70 is engaged between the valve body 21 and the base 20 and includes an orifice 71 for slidably engaging with the valve stem 30 and includes a number of apertures 72 for allowing the water to flow from the chamber 212 into the spray gun 26 via the opening 23. A spring 60 is engaged between the plug 50 and the disc 70 for biasing the plug 50 to engage with the valve seat 28 and for preventing the water from flowing into the spray gun 26.

In operation, as shown in FIG. 1, the spring 60 may bias the plug 50 to engage with the valve seat 28 so as to prevent the water from flowing through the opening 23. When the knob 29 are actuated for allowing the cold water and/or hot water to flow into the passages 21, 22, the water may flow into the chamber 212 via the holes 211 and may flow through the valve seat 24 and thus may flow out through the bore 25 of the faucet 27 for use.

Figure 4:
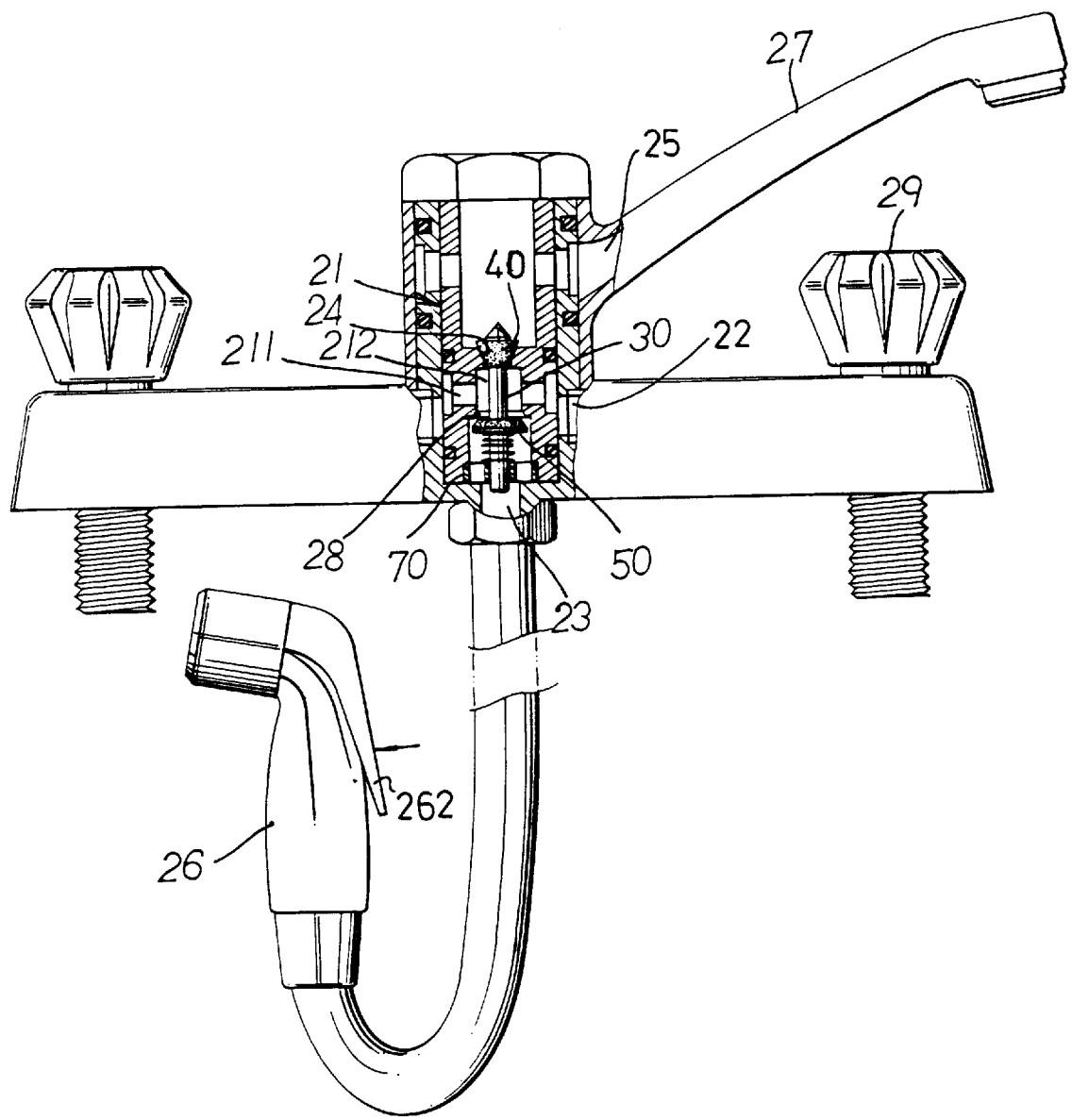
FIG. 4 is a partial cross sectional view similar to FIG. 1, showing the operation of the valve device.

Referring next to FIG. 4, when the handle 262 of the spray gun 26 is actuated, the pressure in the opening 23 is decreased and the water may thus act onto the plug 50 for moving the valve stem 30 downward. The plugs 40, 50 may both be moved downward together with the valve stem 30. However, the plug 40 may be moved downward to engage with the valve seat 24 for preventing water from flowing into the faucet 27. Simultaneously, the plug 50 is moved downward away from the valve seat 28 for opening the valve seat 28 and for allowing the water to flow into the opening 23 through the valve seat 28. When the handle 262 is released, the pressure between the opening 23 and the chamber 212 is balanced and the spring 60 may bias the plug 50 to engage with the valve seat 28 again such that the water is allowed to flow into the faucet 27 again. The knobs 29 may control the water flowing into the passages 21, 22.

Referring next to FIGS. 5–7, alternatively, the valve device may also be disposed laterally. In addition, without the disc 70, the spring 60 may be directly engaged between the plug 50 and the valve body 21 for biasing the plug 50 to engage with the valve seat 28 and for preventing the water from flowing through the spray gun 26. As shown in FIG. 7, the plug 50 may include an annular curved recess 55 for increasing the resilience of the plug 50.

Accordingly, the valve device in accordance with the present invention may be used for controlling the water flowing through either of the faucet or the spray gun when the spray gun is coupled to the faucet.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A valve device comprising:

a base including at least one passage for receiving water and including an opening, a spray gun secured to said base and communicating with said opening, a faucet secured to said base, a valve body engaged in said base and including a chamber for communicating with said opening and said faucet, said valve body including at least one hole for communicating said chamber with said at least one passage and including a first valve seat provided between said chamber and said faucet and including a second valve seat provided between said chamber and said opening, a valve stem slidably engaged in said valve body, a first plug and a second plug secured to said valve stem and moved in concert with said valve stem for engaging with said first valve seat and said second valve seat respectively, and means for biasing said second plug to engage with said second valve seat and for preventing the water from flowing into said opening and for allowing the water to flow into said faucet when said spray gun is not actuated, said second plug being forced to be disengaged from said second valve seat against said biasing means, and said first plug being caused to engage with said first valve seat when said spray gun is actuated, for allowing the water to flow out through said spray gun and for preventing the water from flowing through said faucet.

2. A valve device according to claim 1, wherein said biasing means includes a spring engaged on said valve stem and engaged between said base and said second plug for biasing said second plug to engage with said second valve seat.

3. A valve device according to claim 2 further comprising a disc engaged between said base and said valve body and including an orifice for slidably engaging with said valve stem and including at least one aperture for communicating said chamber with said opening and for allowing water to flow into said spray gun via said at least one aperture and said opening.

4. A valve device according to claim 1, wherein said valve stem includes two annular grooves for engaging with and for securing said first plug and said second plug, said valve stem includes a cone-shaped head for facilitating an engagement of said first plug to said valve stem.

\* \* \* \* \*